(12) United States Patent
He

(10) Patent No.: US 10,248,730 B2
(45) Date of Patent: Apr. 2, 2019

(54) STATISTICAL METHOD AND APPARATUS FOR WEBPAGE ACCESS DATA

(71) Applicant: BEIJING GRIDSUM TECHNOLOGY CO., LTD., Beijing (CN)

(72) Inventor: Kaiduo He, Beijing (CN)

(73) Assignee: BEIJING GRIDSUM TECHNOLOGY CO., LTD., Beijing (CN)

(*) Notice: Subject to any disclaimer, the term of this patent is extended or adjusted under 35 U.S.C. 154(b) by 371 days.

(21) Appl. No.: 15/158,960

(22) Filed: May 19, 2016

(65) Prior Publication Data

US 2016/0267190 A1 Sep. 15, 2016

Related U.S. Application Data

(63) Continuation-in-part of application No. PCT/CN2014/090837, filed on Nov. 11, 2014.

(30) Foreign Application Priority Data

Nov. 19, 2013 (CN) .......................... 2013 1 0585858

(51) Int. Cl.
G06F 7/24 (2006.01)
G06F 11/34 (2006.01)
(Continued)

(52) U.S. Cl.
CPC .......... *G06F 17/30867* (2013.01); *G06F 7/24* (2013.01); *G06F 17/30893* (2013.01);
(Continued)

(58) Field of Classification Search
CPC ............... G06F 11/34; G06F 17/30867; G06F 17/30893; G06F 7/24; G06F 2201/88;
(Continued)

(56) References Cited

U.S. PATENT DOCUMENTS 6,366,956 B1 4/2002 Krishnan
8,255,523 B1* 8/2012 Nikolic .................. H04L 67/22
705/14.41
(Continued)

FOREIGN PATENT DOCUMENTS

CN 102289447 A 12/2011
CN 102736918 A 10/2012
(Continued)

OTHER PUBLICATIONS

International Search Report dated Feb. 16, 2015 issued in PCT/CN2014/090837.

*Primary Examiner* — David T. Brooks
(74) *Attorney, Agent, or Firm* — Scully Scott Murphy & Presser

(57) ABSTRACT

The disclosure discloses a statistical method and apparatus for webpage access data. The method includes that: an initial dataset of user-accessed page behaviors is collected; first-time access data of a user is extracted from the initial dataset; the first-time access data is judged by using a pre-set judgement model to obtain a judgement result; when the judgement result is contrary to a pre-set result of the pre-set judgement model, dating-back matching is performed in the initial dataset by using the first-time access data to obtain associated access data; and the initial dataset is spliced and repaired based on the associated access data to obtain a repaired dataset. By means of the disclosure, the problem in the traditional art that the user identification accuracy is dissatisfactory due to the loss of Cookie information is solved.

10 Claims, 2 Drawing Sheets

(51) Int. Cl.
*G06F 17/30* (2006.01)
*H04L 29/08* (2006.01)

(52) U.S. Cl.
CPC ............ *H04L 67/146* (2013.01); *H04L 67/22* (2013.01); *G06F 11/3438* (2013.01); *G06F 2201/875* (2013.01); *G06F 2201/88* (2013.01)

(58) Field of Classification Search
CPC ........... G06F 2201/875; G06F 11/3438; H04L 67/146; H04L 67/22
USPC ........................................................ 715/745
See application file for complete search history.

(56) References Cited

U.S. PATENT DOCUMENTS

| | | | |
|---|---|---|---|
| 9,064,269 B1* | 6/2015 | Lei | G06Q 30/0241 |
| 2003/0208594 A1* | 11/2003 | Muret | H04L 67/22 |
| | | | 709/224 |
| 2004/0073644 A1* | 4/2004 | Koch | H04L 67/22 |
| | | | 709/223 |
| 2006/0136524 A1* | 6/2006 | Wohlers | H04L 67/02 |
| 2006/0143697 A1* | 6/2006 | Badenell | G06F 21/6245 |
| | | | 726/10 |
| 2011/0078333 A1* | 3/2011 | Jakubowski | H04L 67/1095 |
| | | | 709/248 |
| 2011/0288940 A1* | 11/2011 | Horadan | F16K 31/0634 |
| | | | 705/14.69 |

FOREIGN PATENT DOCUMENTS

| | | |
|---|---|---|
| CN | 103001796 A | 3/2013 |
| CN | 103605738 A | 2/2014 |

* cited by examiner

STATISTICAL METHOD AND APPARATUS FOR WEBPAGE ACCESS DATA

CROSS-REFERENCE TO RELATED APPLICATIONS

This application is a continuation-in-part application of PCT/CN2014/090837 filed on Nov. 11, 2014, which claims priority to Chinese Patent Application No. 201310585858.4, filed on Nov. 19, 2013, the entire contents of each of which are incorporated herein by reference.

TECHNICAL FIELD

The disclosure relates to the field of data statistics, and in particular to a statistical method and apparatus for webpage access data.

BACKGROUND

In the field of website analysis, it is often necessary to connect all behaviours of a user on the internet in series, connect split behaviours such as PV (Page View) and session of the user and attributes thereof and conduct aggregated attribution analysis. These ways are important website traffic analysis means. How to trace a specific behaviour of a visitor and connect specific view conditions of the visitor in series is an important technological means for completing website traffic analysis. A conventional technical solution mainly adopts a Cookie trace mode. Namely, header information of a Set-Cookie is set in a reply for an http request of a relevant webpage, or a cookie is generated at a client via a javascript, a client browser will save a relevant cookie locally, when a user has access to this website next time, the http request will contain this cookie, and therefore a server can know that the request comes from the user who had access to the website last time. By means of the method, repeated behaviours of the same visitor on the website can be traced. However, valid time thereof is expiration time of the cookie.

The disadvantages of the technical solution are that: the identification of the user is completely dependent on the Cookie information; and in a real environment, for example, when a user manually clears Cookies, reinstalls a browser or reinstalls an operating system, Cookie information is easily lost. Consequently, Cookies are probably generated by behaviours of the same visitor for many times, and the behaviours may be identified as the behaviours of multiple different visitors. Thus, the behaviour analysis accuracy of the visitors cannot be guaranteed.

An effective solution is not proposed currently for the problem in the traditional art that the user identification accuracy is dissatisfactory due to the loss of the Cookie information.

SUMMARY

The embodiments of the disclosure provide a statistical method and apparatus for webpage access data, which are intended to at least solve the technical problem in the traditional art that the user behaviour identification accuracy is dissatisfactory due to the loss of Cookie information.

According to one aspect of the embodiments of the disclosure, a statistical method for webpage access data is provided, which may include that: an initial dataset of page access behaviours of a user is collected, the initial dataset including one or more initial page view data, the initial page view data for the user to access the target site data first-time access data of the user is extracted from the initial dataset; the first-time access data is judged by using a pre-set judgement model to obtain a judgement result; when the judgement result is contrary to a pre-set result of the pre-set judgement model, dating-back matching is performed in the initial dataset by using the first-time access data to obtain associated access data; and the initial dataset is spliced and repaired based on the associated access data to obtain a repaired dataset.

Furthermore, before the first-time access data is judged by using the pre-set judgement model to obtain the judgement result, the method may include that: an initial behaviour database of the user is obtained, all PV data of the user being saved in the initial behaviour database, and each piece of PV data including a first-time view field; an attribute of the first-time view field corresponding to each piece of first-time PV data of the user is marked as a correct attribute; the PV data in the initial behaviour database is filtered to obtain a filtered behaviour database; an initial network judgement model is established; and the network judgement model is trained by using data in the filtered behaviour database to obtain the pre-set judgement model.

Furthermore, each piece of PV data may include an access page source field, an access source website field and an access activity name field, and the step that the PV data in the initial behaviour database is filtered to obtain the filtered behaviour database may include that: the PV data of which the access page source field, the access source website field and the access activity name field are null in the initial behaviour database is deleted from the initial behaviour database to obtain the filtered behaviour database.

Furthermore, the step that the first-time access data is judged by using the pre-set judgement model to obtain the judgement result may include that: a first-time access field of the first-time access data is obtained; an attribute of the first-time access field is judged by using the pre-set judgement model; under a condition that the attribute of the first-time access field is correct, it is determined that the judgement result is identical to the pre-set result of the pre-set judgement model; and under a condition that the attribute of the first-time access field is not correct, it is determined that the judgement result is contrary to the pre-set result of the pre-set judgement model.

Furthermore, the step that dating-back matching is performed in the initial dataset by using the first-time access data to obtain the associated access data may include that: the initial PV data identical to an Internet Protocol (IP) of the first-time access data and a browser Identifier (ID) is screened from the initial dataset; initial access time of the initial PV data is compared with first-time access time of the first-time access data; if the initial access time is earlier than the first-time access time, the initial PV data is saved into an access data set; and the initial PV data of which the initial access time is the latest is extracted from the access data set, and the initial PV data of which the initial access time is the latest is taken as the associated access data.

Furthermore, the step that the initial dataset is spliced and repaired based on the associated access data to obtain the repaired dataset may include that: all initial PV data of the user is extracted from the initial dataset; all initial PV data of the user and the associated access data are combined to obtain repaired access data; and the initial dataset is repaired by using the repaired access data to obtain the repaired dataset.

Furthermore, the step that all initial PV data of the user and the associated access data are combined to obtain the repaired access data may include that: a user ID of all initial PV data of the user is modified to a user ID of the associated access data so as to obtain the repaired access data; and the step that the initial dataset is repaired by using the repaired access data to obtain the repaired dataset ay include that: the initial dataset is updated by using the repaired access data to obtain the repaired dataset.

According to another aspect of the embodiments of the disclosure, a statistical apparatus for webpage access data is also provided, which may include: a collection module, configured to collect an initial dataset of page access behaviours of a user, the initial dataset including one or more initial page view data, the initial page view data for the user to access the target site data; a first data extraction module, configured to extract first-time access data of the user from the initial dataset; a judgement module, configured to judge the first-time access data by using a pre-set judgement model to obtain a judgement result; a matching module, configured to perform dating-back matching in the initial dataset by using the first-time access data to obtain associated access data when the judgement result is contrary to a pre-set result of the pre-set judgement model; and a repairing module, configured to splice and repair the initial dataset based on the associated access data to obtain a repaired dataset.

Furthermore, the statistical apparatus for webpage access data may further include: a database obtaining module, configured to obtain an initial behaviour database of the user, all PV data of the user being saved in the initial behaviour database, and each piece of PV data including a first-time view field; an attribute marking module, configured to mark an attribute of the first-time view field corresponding to each piece of first-time PV data of the user as a correct attribute; a filtration module, configured to filter the PV data in the initial behaviour database to obtain a filtered behaviour database; a model establishment module, configured to establish an initial network judgement model; and a model obtaining module, configured to train the network judgement model by using data in the filtered behaviour database to obtain the pre-set judgement model.

Furthermore, the filtration module may be configured to: delete the PV data of which an access page source field, an access source website field and an access activity name field are null in the initial behaviour database from the initial behaviour database to obtain the filtered behaviour database, each piece of PV data including the access page source field, the access source website field and the access activity name field.

Furthermore, the judgement module may include: a field obtaining module, configured to obtain a first-time access field of the first-time access data; an attribute judgement module, configured to judge an attribute of the first-time access field by using the pre-set judgement model; a first determination module, configured to determine that the judgement result is identical to the pre-set result of the pre-set judgement model under a condition that the attribute of the first-time access field is correct; and a second determination module, configured to determine that the judgement result is contrary to the pre-set result of the pre-set judgement model under a condition that the attribute of the first-time access field is not correct.

Furthermore, the matching module may include: a filtering module, configured to screen the initial PV data identical to an IP of the first-time access data and a browser ID from the initial dataset; a comparison module, configured to compare initial access time of the initial PV data with first-time access time of the first-time access data; a saving module, configured to save the initial PV data into an access data set if the initial access time is earlier than the first-time access time; and a second data extraction module, configured to extract the initial PV data of which the initial access time is the latest from the access data set, and take the initial PV data of which the initial access time is the latest as the associated access data.

Furthermore, the repairing module may include: a third data extraction module, configured to extract all initial PV data of the user from the initial dataset; a combination module, configured to combine all initial PV data of the user and the associated access data to obtain repaired access data; and a repairing sub-module, configured to repair the initial dataset by using the repaired access data to obtain the repaired dataset.

Furthermore, the combination module may include: a combination sub-module, configured to modify a user ID of all initial PV data of the user to a user ID of the associated access data so as to obtain the repaired access data; and the repairing sub-module, configured to update the initial dataset by using the repaired access data to obtain the repaired dataset.

In the embodiments of the disclosure, after the matching module matches the associated access data, the initial dataset is repaired based on the associated access data to obtain the repaired dataset, so that data obtained due to the Cookie loss can be spliced, data of cookies probably generated by behaviours of the same visitor for many times can be reduced, data needing to be re-recorded due to the Cookie loss can be reduced, and the problem in the traditional art that the user identification accuracy is dissatisfactory due to the loss of Cookie information is solved, thereby achieving the effect of making accurate statistics of the user-accessed page data, counteracting the side effect resulting from the Cookie loss, and connecting user behaviours in series to fulfill the aim of revealing real user behaviours.

BRIEF DESCRIPTION OF THE DRAWINGS

The drawings described here are intended to provide further understanding of the disclosure, and form a part of the disclosure. The schematic embodiments and descriptions of the disclosure are intended to explain the disclosure, and do not form improper limits to the disclosure. In the drawings.

DETAILED DESCRIPTION OF THE EMBODIMENTS

Figure 1:
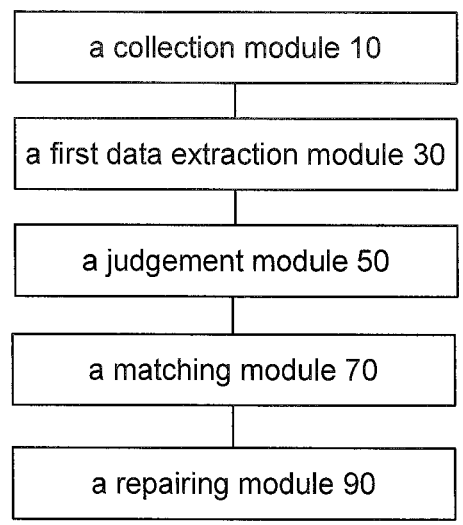
FIG. 1 is a diagram of a statistical apparatus for webpage access data according to a first embodiment of the disclosure.

Firstly, some phrases or terms occurring in a process of describing the embodiments of the disclosure are applicable to being explained as follows.

In order to make those skilled in the art better understand the solutions of the disclosure, the technical solutions in the embodiments of the disclosure are clearly and completely described below with reference to the drawings in the embodiments of the disclosure. Obviously, the described embodiments are only a part of the embodiments of the disclosure, not all of the embodiments. Based on the embodiments of the disclosure, all other embodiments obtained on the premise of no creative work of those skilled in the art shall fall within the protection scope of the disclosure.

It is important to note that the description and claims of the disclosure and terms "first", "second" and the like in the drawings are intended to distinguish similar objects, and do not need to describe a specific sequence or a precedence order. It should be understood that used data can be exchanged under appropriate conditions, in order that the embodiments of the disclosure described here can be implemented in a sequence except sequences graphically shown or described here. In addition, terms "include" and "have" and any inflexions thereof are intended to cover non-exclusive inclusions. For example, processes, methods, systems, products or devices containing a series of steps or units do not need to clearly show those steps or units, and can include other inherent steps or units of these processes, methods, products or devices, which are not clearly shown.

As shown in FIG. 1, according to an embodiment of the disclosure, a statistical apparatus for webpage access data is provided, which includes: a collection module 10, configured to collect an initial dataset of page access behaviours of a user, the initial dataset including one or more initial page view data, the initial page view data for the user to access the target site data; a first data extraction module 30, configured to extract first-time access data of the user from the initial dataset; a judgement module 50, configured to judge the first-time access data by using a pre-set judgement model to obtain a judgement result; a matching module 70, configured to perform dating-back matching in the initial dataset by using the first-time access data to obtain associated access data when the judgement result is contrary to a pre-set result of the pre-set judgement model; and a repairing module 90, configured to splice and repair the initial dataset based on the associated access data to obtain a repaired dataset.

By means of the disclosure, the initial dataset of a user access page can be collected by using the collection module, after the first data extraction module extracts the first-time access data of the user from the initial dataset, the judgement module judges the first-time access data by using the pre-set judgement model to obtain the judgement result, the matching module performs dating-back matching in the initial dataset by using the first-time access data to obtain the associated access data when the judgement result is contrary to the pre-set result of the pre-set judgement model, and then the repairing module repairs the initial dataset based on the associated access data to obtain the repaired dataset. After the matching module matches the associated access data, the initial dataset is repaired based on the associated access data to obtain the repaired dataset, so that data obtained due to the Cookie loss can be spliced, data of cookies probably generated by behaviours of the same visitor for many times can be reduced, data needing to be re-recorded due to the Cookie loss can be reduced, and the problem in the traditional art that the user identification accuracy is dissatisfactory due to the loss of Cookie information is solved, thereby achieving the effect of making accurate statistics of the user-accessed page data, counteracting the side effect resulting from the Cookie loss, and connecting user behaviours in series to fulfill the aim of revealing real user behaviours.

Wherein, page access behaviour data of the user, which may mainly refer to the PV data (that is, the initial PV data in the above embodiment) of the user viewing a target website, can be saved in the initial dataset. The first-time access data in the initial dataset is configured to represent: data having the same uid and regarding the earliest access in the initial PV data, wherein the uid refers to a user unique identifier namely a user id.

The first-time access data in the initial dataset is judged in the disclosure. If the judgement result is consistent with the pre-set result, it is determined that the first-time access data is real data generated when the user has access to the website for the first time; if the judgement result is inconsistent with the pre-set result (the judgement result is contrary to the pre-set), it is determined that the first-time access data is not the real data generated when the user has access to the website for the first time, and therefore the data should not be taken as first-time access view data of the user when the view behaviours of the user are traced; and meanwhile, it is shown that the initial PV data of the user recorded in the initial dataset is segmented.

Under this situation, in the above embodiment of the disclosure, dating-back matching is performed on the first-time access data for which the judgement result is contrary to the pre-set result in the initial dataset to obtain the associated access data belonging to the same user, wherein the access time of the associated access data is prior to the first-time access data, not the first-time access data actually.

After the associated access data of which the access time is earlier than that of the first-time access data is obtained, all initial PV data belonging to the same user are spliced and repaired by utilizing the associated access data to obtain the repaired dataset.

Specifically, the uid of the first-time access data and the uid of PV having the same uid as the first-time access data are set as the uid of the associated access data, and therefore the splicing and repairing operation can be completed. That is, the first-time access data and data having the same uid as the first-time access data are modified in the splicing and repairing operation, but the number of data is not increased or decreased substantially. Consequently, the number of data in the repaired dataset and the number of data in the initial dataset are substantially identical. Differently, the uid of some data in the repaired dataset is different from that of the corresponding data in the initial dataset, and an access behaviour link formed by user-accessed PV data in the repaired dataset is more accurate and is not segmented.

In the above embodiment of the disclosure, the repairing module 90 may include: a third data extraction module, configured to extract all initial PV data of the user from the initial dataset; a combination module, configured to combine the initial PV data and the associated access data to obtain repaired access data; and a repairing sub-module, configured to repair the initial dataset by using the repaired access data to obtain the repaired dataset.

Specifically, in the above embodiment, the collection module can obtain the initial dataset based on cookie trace. The page access behaviour data of the user, which may mainly refer to the PV data (that is, the initial PV data in the above embodiment) of the user viewing the target website, can be saved in the initial dataset. The PV data can be obtained by deploying javascript codes on a page.

More specifically, the initial dataset obtained in the above embodiment can be shown in a form of a data table PVtable, each piece of initial PV data therein may include one or more fields which may be PVid, uid, url, time, ip, useragent, adsource, adcompaign, trafficsource, isfirst* and hour*, and the fields refer to a PV unique ID, a user unique ID, a PV-accessed url, occurrence time of PV, user ip, a useragent ID of a user browser, an advertisement source, an advertisement campaign name, a source website, a judgement whether the PV is first PV, and an affiliated hour of the occurrence time of the PV. Wherein, the uid is generated by a front-end javascript based on a traditional cookie trace means, and it can be ensured that the PV having the same uid comes from the same user; and the asterisked fields are set as null values when the collection module collects the initial dataset, and values of the asterisked fields are obtained by filtering and calculating the data. Both the PV and the PV in the embodiment of the disclosure refer to the PageView data.

Wherein, the advertisement source and the advertisement name in the above embodiment specifically refer to advertisement-related information (if existence) of the current PV, and this piece of information can be obtained by analyzing parameters of the url ordinarily.

For example, for
www.abc.com/
page1.aspx?utm_source=s1&utm_campaign=s2,
the advertisement source (corresponding to a utm_source parameter ordinarily) is s1, and the advertisement campaign name (corresponding to a utm_campaign parameter ordinarily) is s2. These parameters can be manually set to mark advertisements which bring relevant accesses.

Wherein, the pre-set judgement model in the above embodiment may be a judgement model which takes the PV data of which the value of the isFirst field is correct as a training set and trains the value of isFirst to be correct, and the first-time access data in all sets in which the isFirst is correct is judged by using a pre-set model, so as to obtain fake-first PV (namely referring to that the value of the isFirst field is not correct) contrary to the result of the judgement model. For the fake-first PV, forward matching is performed by utilizing ip, useragent and time to find relevant PV (namely the associated access data), and all initial PV data of the user and affiliated visitor behaviours (namely the associated access data) of the fake-first PV are combined to obtain modified visitor behaviours (namely the repaired dataset). In the embodiment, based on Cookie trace, the visitor behaviours can be spliced by means of a machine/model learning method, the side effect resulting from the Cookie loss is counteracted, and data inaccuracy brought by the cookie loss can be modified to fulfill the aim of revealing real user behaviours by series connection.

It is further important to note that in the step, the pre-set judgement model is mainly formed by modeling in correspondence to correct PV data by utilizing the isFirst fields, the obtained first-time access data is judged in the judgement model, when it is judged that the first-time access data is contrary to the PV data in the model, it can be determined that the value of the isFirst of the first-time access data is not correct, and it is also judged that the first-time access data refers to the fake-first PV.

In the above embodiment of the disclosure, the statistical apparatus for webpage access data may further include: a database obtaining module, configured to obtain an initial behaviour database of the user, all PV data of the user being saved in the initial behaviour database, and each piece of PV data including a first-time view field; an attribute marking module, configured to mark an attribute of the first-time view field corresponding to each piece of first-time PV data of the user as a correct attribute; a filtration module, configured to filter the PV data in the initial behaviour database to obtain a filtered behaviour database; a model establishment module, configured to establish an initial network judgement model; and a model obtaining module, configured to train the network judgement model by using data in the filtered behaviour database to obtain the pre-set judgement model.

Specifically, the filtration module may be configured to: delete the PV data of which an access page source field, an access source website field and an access activity name field are null in the initial behaviour database from the initial behaviour database to obtain the filtered behaviour database, each piece of PV data including the access page source field (namely the source website), the access source website field (namely the advertisement source) and the access activity name field (namely the advertisement campaign name).

Specifically, when a client script is executed in a browser, a unique ID can be generated for the user, and the ID is sent to a visitor behaviour log system at a data processing end along with recording of a visitor PV behaviour; and after the data processing end receives relevant data (namely the PV data in the initial behaviour database), an isFirst (namely the first-time view field) is marked on the PV data according to the judgement whether the user ID occurs for the first time in a time sequence, namely the attribute of the first-time view field corresponding to the first-time PV data of the user is marked as the correct attribute.

According to the above embodiment of the disclosure, the attribute marking module selects the first PV of all users from the access behaviour database, and when the isFirst fields of these PV data are set to be TRUE, the following source codes can be used:

```
Update PVtable set isfirst = true where PVid in
(select PVid from
  ( select PVid, ROW_NUMBER( ) over (partition by uid order by
    time) as PVorder
from PVtable
)
    Where PVorder = 1
)
```

In the process of filtering the PV data in the initial behaviour database by the filtration module, PV which is not the first PV of the user and comes from the target website can be removed firstly, that is data which is not the first-time PV data of the user-accessed website is filtered. The following SQL-like source codes can be used in the filtration step:
delete from PVtable where isfirst=false and trafficsource.site=url.site.

Specifically, site skips can be removed by means of the above step.

For example, PV1: a.com/p1.html (from b.com/someAd.html)
PV2: a.com/p2.html (from a.com/p1.html)
PV3: a.com/p3.html (from a.com/p2.html)
PV2 and PV3 can be removed by means of the above step.

After the filtration is completed, the filtration module can also filter remaining data in the initial behaviour database. In the filtration process, the PV which is not the first PV of the user and the PV of which adsource and adcompaign are null can be removed. The following SQL-like source codes can be used in the filtration process:
delete from PVtable where isfirst=false and adsource is null and adcompaign is null.

After the filtration module filters the data in the initial behaviour database, a processed PV behaviour database namely the filtered behaviour database can be obtained. The filtered behaviour database will be taken as a training dataset constructed by a neural network model.

In the above embodiment of the disclosure, the neural network model (namely the initial network judgement model) can be established via the model establishment module, and the initial network judgement model is trained by using the training dataset (namely the filtered behaviour database). Specifically, input fields are adsource, adcompaign, trafficsource, isfirst* and hour* in the filtered behaviour database, the pre-set judgement model is obtained after training of the initial network judgement model is completed, and the pre-set judgement model has a result judgement ability according to the given adsource, adcompaign, trafficsource and hour*. Specifically, in the embodiment, the pre-set judgement model has an ability to judge the isfirst value of the access data, and the pre-set result in the pre-set judgement model is an objective result which accords with an objective law.

In the above embodiment of the disclosure, the judgement module 50 may include: a field obtaining module, configured to obtain a first-time access field of the first-time access data; an attribute judgement module, configured to judge an attribute of the first-time access field by using the pre-set judgement model; a first determination module, configured to determine that the judgement result is identical to the pre-set result of the pre-set judgement model under the condition that the attribute of the first-time access field is correct; and a second determination module, configured to determine that the judgement result is contrary to the pre-set result of the pre-set judgement model under the condition that the attribute of the first-time access field is not correct.

Specifically, for new access behaviour data (namely the initial PV data in the initial dataset in the above embodiment), first PV data (the first-time access data in the above embodiment) of a uid of each piece of initial PV data and each field attribute of the data are obtained. More specifically, the attribute of the isfirst (specifically referring to the first-time access field) of the first PV of each uid is judged by using the pre-set judgement model, the first determination module determines that the judgement result is identical to the pre-set result of the pre-set judgement model under the condition that the attribute of the first-time access field is correct, and the second determination module determines that the judgement result is contrary to the pre-set result of the pre-set judgement model under the condition that the attribute of the first-time access field is not correct. The data corresponding to the contrary judgement result in the above embodiment can be saved in a result set, and the result set is a set of data of which the isfirst attribute is false, namely a set (called a fake-first PV set below) suspected to cause a cookie trace trap. All initial PV data probably subjected to cookie trace trap is saved in the result set.

According to the above embodiment of the disclosure, the matching module 70 may include: a filtering module, configured to screen the initial PV data identical to an IP of the first-time access data and a browser ID from the initial dataset; a comparison module, configured to compare initial access time of the initial PV data with first-time access time of the first-time access data; a saving module, configured to save the initial PV data into an access data set if the initial access time is earlier than the first-time access time; and a second data extraction module, configured to extract the initial PV data of which the initial access time is the latest from the access data set, and take the initial PV data of which the initial access time is the latest as the associated access data.

In the above embodiment of the disclosure, the fake-first PV set judged by the judgement module 50 can be saved in a fakefirstPVs (namely fake-first PV) data table, and then each piece of data in the fake-first PV set is retrieved in the initial dataset to find PV which may probably be the previous PV. Specifically, dating-back matching is performed by using attributes of the three fields: ip, useragent and time to search for PV (the associated access data) of which ip and useragent are identical to those of this PV and time is smaller than but closest to that of this PV. The following SQL-like source codes can be used in the step:

Update fakefirstPV as ffp set ffp.previousPV=(select max (PVid) from PVtable where PVtable.ip=ffp.ip and PVtable.useragent=ffp.useragent and PVtable.time<ffp.time)

Where exists (select * from PVtable where PVtable.ip=ffp.ip and PVtable.useragent=ffp.useragent and PVtable.time<ffp.time)

After the matching module performs dating-back matching in the initial dataset by using the first-time access data to obtain the associated access data, the combination module combines all initial PV data of the user and the associated access data to obtain the repaired access data, and the repairing sub-module repairs the initial dataset by using the repaired access data to obtain the repaired dataset. Here, in prior to combination, the initial PV data of the user can be identified by using the uid.

According to the above embodiment of the disclosure, the combination module includes: a combination sub-module, configured to modify a user ID of all initial PV data of the user to a user ID of the associated access data so as to obtain the repaired access data; and the repairing sub-module, configured to update the initial dataset by using the repaired access data to obtain the repaired dataset.

Specifically, the uid of all found and matched fake-first PV (namely the first-time access data) and the uid of other PV having the same uid are set as the uid of the forwardly matched PV (namely the associated access data), and the splicing and repairing operation of the visitor behaviours are completed.

By means of the above embodiment of the disclosure, after the combination sub-module combines the associated access data and all initial PV data of the user, the first-time access data of the user extracted from the initial dataset is returned until all fake-first PV cannot find the forwardly matched PV. In the above embodiment of the disclosure, it is necessary for the combination sub-module to execute combination operation until all fake-first PV cannot find the forwardly matched PV finally.

In the above embodiment of the disclosure, a broken user behaviour chain is spliced by using a machine learning (namely model learning) method based on a traditional Cookie trace-based mode, data deviation caused by the Cookie loss can be effectively counteracted, and the problem of data inaccuracy of a traditional method is repaired to a great extent.

Figure 2:
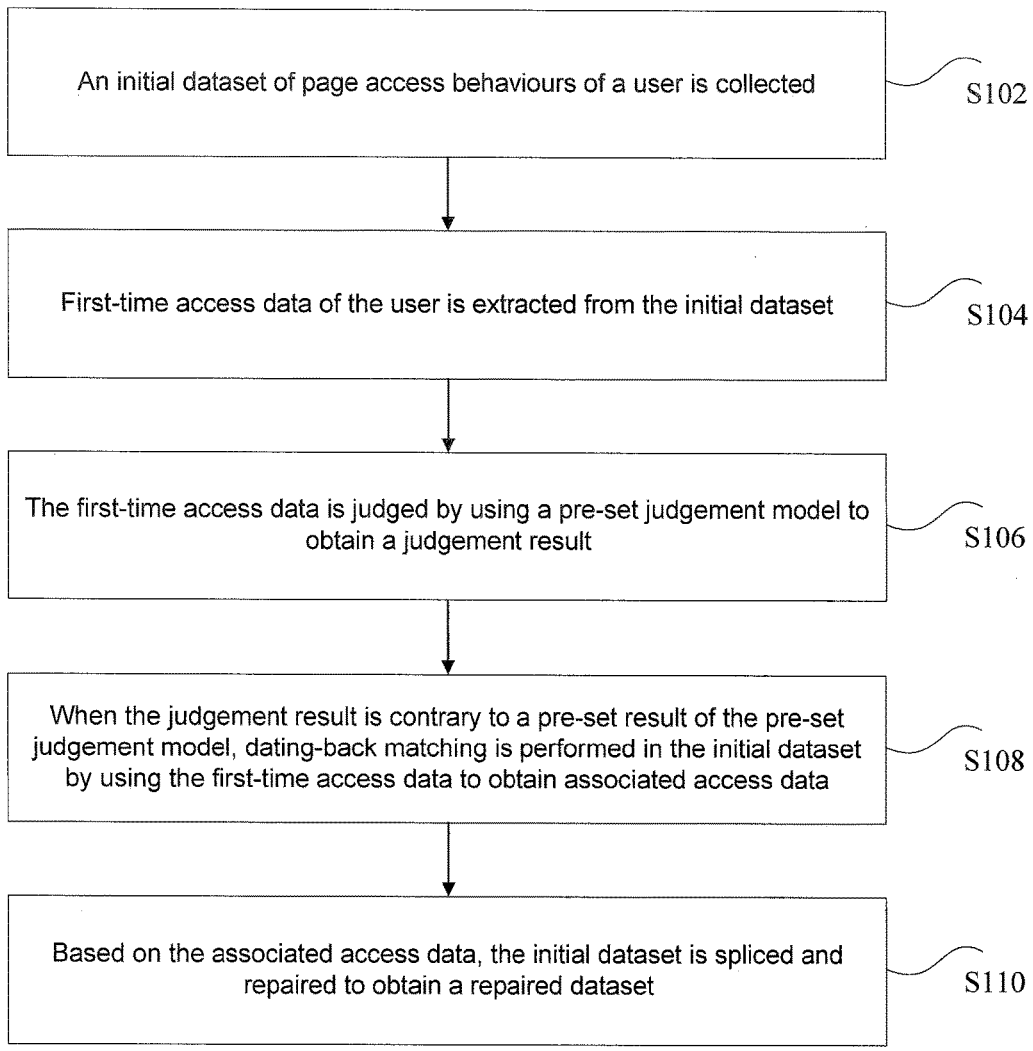
FIG. 2 is a flowchart of a statistical method for webpage access data according to a second embodiment of the disclosure.

As shown in FIG. 2, according to an embodiment of the disclosure, a statistical method for webpage access data is also provided, which may include the steps as follows.

Step S102: An initial dataset of page access behaviours of a user is collected, the initial dataset including one or more initial page view data, the initial page view data for the user to access the target site data.

Step S104: First-time access data of the user is extracted from the initial dataset.

Step S106: The first-time access data is judged by using a pre-set judgement model to obtain a judgement result.

Step S108: When the judgement result is contrary to a pre-set result of the pre-set judgement model, dating-back matching is performed in the initial dataset by using the first-time access data to obtain associated access data.

Step S110: Based on the associated access data, the initial dataset is spliced and repaired to obtain a repaired dataset.

By means of the disclosure, the initial dataset of a user access page can be collected by using a collection module, after a first data extraction module extracts the first-time access data of the user from the initial dataset, a judgement module judges the first-time access data by using the pre-set judgement model to obtain the judgement result, a matching module performs dating-back matching in the initial dataset by using the first-time access data to obtain the associated access data when the judgement result is contrary to the pre-set result of the pre-set judgement model, and then a repairing module repairs the initial dataset based on the associated access data to obtain the repaired dataset. After the matching module matches the associated access data, the initial dataset is repaired based on the associated access data to obtain the repaired dataset, so that data obtained due to the Cookie loss can be spliced, data of cookies probably generated by behaviours of the same visitor for many times can be reduced, data needing to be re-recorded due to the Cookie loss can be reduced, and the problem in the traditional art that the user identification accuracy is dissatisfactory due to the loss of Cookie information is solved, thereby achieving the effect of making accurate statistics of the user-accessed page data, counteracting the side effect resulting from the Cookie loss, and connecting user behaviours in series to fulfill the aim of revealing real user behaviours.

In the above embodiment of the disclosure, the step that the initial dataset of a user-accessed behaviour is spliced and repaired based on the associated access data to obtain the repaired dataset may include that: all initial PV data of the user is extracted from the initial dataset; initial PV data and the associated access data are combined to obtain repaired access data; and the initial dataset is repaired by using the repaired access data to obtain the repaired dataset.

Specifically, in the above embodiment, the collection module can obtain the initial dataset based on cookie trace. Page access behaviour data of the user, which may mainly refer to the PV data (that is, the initial PV data in the above embodiment) of the user viewing a target website, can be saved in the initial dataset. The PV data can be obtained by deploying javascript codes on a page.

More specifically, the initial dataset obtained in the above embodiment can be shown in a form of a data table PVtable, each piece of initial PV data therein may include one or more fields which may be PVid, uid, url, time, ip, useragent, adsource, adcompaign, trafficsource, isfirst* and hour*, and the fields refer to a PV unique ID, a user unique ID, a PV-accessed url, occurrence time of PV, user ip, a useragent ID of a user browser, an advertisement source, an advertisement campaign name, a source website, judgement whether the PV is first PV, and an affiliated hour of the occurrence time of the PV. Wherein, the uid is generated by a front-end javascript based on a traditional cookie trace means, and it can be ensured that the PV having the same uid comes from the same user; and the asterisked fields are set as null values when the collection module collects the initial dataset, and values of the asterisked fields are obtained by filtering and calculating the data. Both the PV and the PV in the embodiment of the disclosure refer to the PageView data.

Wherein, the pre-set judgement model in the above embodiment may be a judgement model which takes the PV data of which the value of the isFirst field is correct as a training set and trains the value of isFirst to be correct, and the first-time access data in all sets in which the isFirst is correct is judged by using a pre-set model, so as to obtain fake-first PV (namely referring to that the value of the isFirst field is not correct) contrary to the result of the judgement model. For the fake-first PV, forward matching is performed by utilizing ip, useragent and time to find relevant PV (namely the associated access data), and all initial PV data of the user and affiliated visitor behaviours (namely the associated access data) of the fake-first PV are combined to obtain modified visitor behaviours (namely the repaired dataset). In the embodiment, based on Cookie trace, the visitor behaviours can be spliced by means of a machine/ model learning method, the side effect resulting from the Cookie loss is counteracted, and data inaccuracy brought by the cookie loss can be modified to fulfill the aim of revealing real user behaviours by series connection.

According to the above embodiment of the disclosure, before the first-time access data is judged by using the pre-set judgement model to obtain the judgement result, the method may include that: an initial behaviour database of the user is obtained, all PV data of the user being saved in the initial behaviour database, and each piece of PV data including a first-time view field; an attribute of the first-time view field corresponding to each piece of first-time PV data of the user is marked as a correct attribute; the PV data in the initial behaviour database is filtered to obtain a filtered behaviour database; an initial network judgement model is established; and the network judgement model is trained by using data in the filtered behaviour database to obtain the pre-set judgement model.

Specifically, each piece of PV data includes an access page source field, an access source website field and an access activity name field, and the step that the PV data in the initial behaviour database is filtered to obtain the filtered behaviour database may include that: the PV data of which the access page source field, the access source website field and the access activity name field are null in the initial behaviour database is deleted from the initial behaviour database to obtain the filtered behaviour database.

Specifically, when a client script is executed in a browser, a unique ID can be generated for the user, and the ID is sent to a visitor behaviour log system at a data processing end along with recording of a visitor PV behaviour; and after the data processing end receives relevant data (namely the PV data in the initial behaviour database), an isFirst (namely the first-time view field) is marked on the PV data according to the judgement whether the user ID occurs for the first time in a time sequence, namely the attribute of the first-time view field corresponding to the first-time PV data of the user is marked as the correct attribute.

According to the above embodiment of the disclosure, an attribute marking module selects the first PV of all users from the access behaviour database, and when the isFirst fields of these PV data are set to be TRUE, the following source codes can be used:

```
Update PVtable set isfirst = true where PVid in
(select PVid from
 ( select PVid, ROW_NUMBER( ) over (partition by uid order by
 time) as PVorder
from PVtable
)
    Where PVorder = 1
)
```

In the process of filtering the PV data in the initial behaviour database by a filtration module, PV which is not the first PV of the user and comes from the target website can be removed firstly, that is data which is not the first-time PV data of the user-accessed website is filtered. The following SQL-like source codes can be used in the filtration step:

delete from PVtable where isfirst=false and trafficsource.site=url.site.

After the filtration is completed, the filtration module can also filter remaining data in the initial behaviour database. In the filtration process, the PV which is not the first PV of the user and the PV of which adsource and adcompaign are null can be removed. The following SQL-like source codes can be used in the filtration process:

delete from PVtable where isfirst=false and adsource is null and adcompaign is null.

After the filtration module filters the data in the initial behaviour database, a processed PV behaviour database namely the filtered behaviour database can be obtained. The filtered behaviour database will be taken as a training dataset constructed by a neural network model.

In the above embodiment of the disclosure, the neural network model (namely the initial network judgement model) can be established via a model establishment module, and the initial network judgement model is trained by using the training dataset (namely the filtered behaviour database). Specifically, input fields are adsource, adcompaign, trafficsource, isfirst* and hour* in the filtered behaviour database, the pre-set judgement model is obtained after training of the initial network judgement model is completed, and the pre-set judgement model has a result judgement ability according to the given adsource, adcompaign, trafficsource and hour*. Specifically, in the embodiment, the pre-set judgement model has an ability to judge the isfirst value of the access data.

In the above embodiment of the disclosure, the step that the first-time access data is judged by using the pre-set judgement model to obtain the judgement result includes that: a first-time access field of the first-time access data is obtained; an attribute of the first-time access field is judged by using the pre-set judgement model; under the condition that the attribute of the first-time access field is correct, it is determined that the judgement result is identical to the pre-set result of the pre-set judgement model; and under the condition that the attribute of the first-time access field is not correct, it is determined that the judgement result is contrary to the pre-set result of the pre-set judgement model.

Specifically, for new access behaviour data (namely the initial PV data in the initial dataset in the above embodiment), first PV data (the first-time access data in the above embodiment) of a uid of each piece of initial PV data and each field attribute of the data are obtained. More specifically, the attribute of the isfirst (specifically referring to the first-time access field) of the first PV of each uid is judged by using the pre-set judgement model, a first determination module determines that the judgement result is identical to the pre-set result of the pre-set judgement model under the condition that the attribute of the first-time access field is correct, and a second determination module determines that the judgement result is contrary to the pre-set result of the pre-set judgement model under the condition that the attribute of the first-time access field is not correct. The data corresponding to the contrary judgement result in the above embodiment can be saved in a result set, and the result set is a set of data of which the isfirst attribute is false, namely a set (called a fake-first PV set below) suspected to cause a cookie trace trap. All initial PV data probably subjected to cookie trace trap is saved in the result set.

According to the above embodiment of the disclosure, the step that dating-back matching is performed in the initial dataset by using the first-time access data to obtain the associated access data may include that: the initial PV data identical to an IP of the first-time access data and a browser Identifier ID is screened from the initial dataset; initial access time of the initial PV data is compared with first-time access time of the first-time access data; if the initial access time is earlier than the first-time access time, the initial PV data is saved into an access data set; and the initial PV data of which the initial access time is the latest is extracted from the access data set, and the initial PV data of which the initial access time is the latest is taken as the associated access data.

In the above embodiment of the disclosure, the fake-first PV set judged by the judgement module 50 can be saved in a fakefirstPVs (namely fake-first PV) data table, and then each piece of data in the fake-first PV set is retrieved in the initial dataset to find PV which may probably be the previous PV. Specifically, dating-back matching is performed by using attributes of the three fields: ip, useragent and time to search for PV (the associated access data) of which ip and useragent are identical to those of this PV and time is smaller than but closest to that of this PV. The following SQL-like source codes can be used in the step:

Update fakefirstPV as ffp set ffp.previousPV=(select max (PVid) from PVtable where PVtable.ip=ffp.ip and PVtable.useragent=ffp.useragent and PVtable.time<ffp.time)

Where exists (select * from PVtable where PVtable.ip=ffp.ip and PVtable.useragent=ffp.useragent and PVtable.time<ffp.time)

After the matching module performs dating-back matching in the initial dataset by using the first-time access data to obtain the associated access data, a combination module combines all initial PV data of the user and the associated access data to obtain the repaired access data, and the repairing sub-module repairs the initial dataset by using the repaired access data to obtain the repaired dataset. Here, in prior to combination, the initial PV data of the user can be identified by using the uid.

According to the above embodiment of the disclosure, the step that all initial PV data of the user and the associated access data are combined to obtain the repaired access data includes that: a user ID of all initial PV data of the user is modified to a user ID of the associated access data so as to obtain the repaired access data; and the step that the initial dataset is repaired by using the repaired access data to obtain the repaired dataset ay include that: the initial dataset is updated by using the repaired access data to obtain the repaired dataset.

Specifically, the uid of all found and matched fake-first PV (namely the first-time access data) and the uid of other PV having the same uid are set as the uid of the forwardly matched PV (namely the associated access data), and the splicing and repairing operation of the visitor behaviours are completed.

By means of the above embodiment of the disclosure, after a combination sub-module combines the associated access data and all initial PV data of the user, the first-time access data of the user extracted from the initial dataset is returned until all fake-first PV cannot find the forwardly matched PV. In the above embodiment of the disclosure, it is necessary for the combination sub-module to execute combination operation until all fake-first PV cannot find the forwardly matched PV finally.

In the above embodiment of the disclosure, a broken user behaviour chain is spliced by using a machine learning (namely model learning) method based on a traditional Cookie trace-based mode, data deviation caused by the Cookie loss can be effectively counteracted, and the problem of data inaccuracy of a traditional method is repaired to a great extent.

It is important to note that it is expressed as a series of motion assemblies in order to simply describe each of the above method embodiments. However, those skilled in the art should know that the disclosure is not limited by a described motion sequence since certain steps can be executed in other sequences or at the same time according to the disclosure. Secondly, those skilled in the art should know that the described embodiments in the description belong to preferred embodiments, and involved motions and modules may not be necessary to the disclosure.

By means of the descriptions of the above implementation modes, those skilled in the art can clearly know that the method according to the above embodiment can be implemented in a mode of software and a necessary general hardware platform, and can be implemented by means of hardware certainly. However, the former is a better implementation mode under many situations. Based on the understanding, an essential part of the technical solution of the disclosure or a part contributing to the traditional art can be embodied in a form of a software product. The computer software product is stored in a storage medium such as a Read-Only Memory (ROM)/a Random Access Memory (RAM), a magnetic disc or an optical disc, including a plurality of instructions configured to enable a computer device which may be a mobile phone, a computer, a server, a network device or the like to execute the method according to each embodiment of the disclosure.

The sequence numbers of the above embodiments of the disclosure are only used for descriptions, and are not representative of the preference of the embodiments.

In the above embodiments of the disclosure, the description of each embodiment is emphasized. A part which is not described in detail in a certain embodiment can refer to relevant descriptions of the other embodiments.

From the above descriptions, it can be seen that the disclosure achieves the technical effects as follows. After the matching module matches the associated access data, the initial dataset is repaired based on the associated access data to obtain the repaired dataset, so that data obtained due to the Cookie loss can be spliced, data of cookies probably generated by behaviours of the same visitor for many times can be reduced, data needing to be re-recorded due to the Cookie loss can be reduced, and the problem in the traditional art that the user identification accuracy is dissatisfactory due to the loss of Cookie information is solved, thereby achieving the effect of making accurate statistics of the user-accessed page data, counteracting the side effect resulting from the Cookie loss, and connecting user behaviours in series to fulfill the aim of revealing real user behaviours.

Obviously, those skilled in the art should understand that all modules or all steps in the disclosure can be realized by using a general calculation apparatus, can be centralized on a single calculation apparatus or can be distributed on a network composed of a plurality of calculation apparatuses. Optionally, they can be realized by using executable program codes of the calculation apparatuses. Thus, they can be stored in a storage apparatus and executed by the calculation apparatuses, or they are manufactured into each integrated circuit module respectively, or a plurality of modules or steps therein are manufactured into a single integrated circuit module. Thus, the disclosure is not limited to a combination of any specific hardware and software.

The above is only the preferred embodiments of the disclosure, and is not intended to limit the disclosure. There can be various modifications and variations in the disclosure for those skilled in the art. Any modifications, equivalent replacements, improvements and the like within the spirit and principle of the disclosure shall fall within the protection scope of the disclosure.

What is claimed is:

1. A statistical method for webpage access data, comprising:
    collecting an initial dataset of page access behaviours of a user, wherein the initial dataset comprising one or more initial page view data, the initial page view data for the user to access the target site data;
    extracting first-time access data of the user from the initial dataset;
    judging the first-time access data by using a pre-set judgement model to obtain a judgement result;
    performing dating-back matching in the initial dataset by using the first-time access data to obtain associated access data when the judgement result is contrary to a pre-set result of the pre-set judgement model; and
    splicing and repairing the initial dataset based on the associated access data to obtain a repaired dataset;
    wherein performing dating-back matching in the initial dataset by using the first-time access data to obtain the associated access data comprises:
    filtering the initial PV (page view) data identical to an Internet Protocol (IP) of the first-time access data and a browser Identifier (ID) from the initial dataset;
    comparing initial access time of the initial PV data with first-time access time of the first-time access data;
    saving the initial PV data into an access data set if the initial access time is earlier than the first-time access time; and
    extracting the initial PV data of which the initial access time is the latest from the access data set, and taking the initial PV data of which the initial access time is the latest as the associated access data;
    wherein the step of splicing and repairing the initial dataset based on the associated access data to obtain the repaired dataset comprises:
    extracting all initial PV data of the user from the initial dataset;
    combining all initial PV data of the user and the associated access data to obtain repaired access data; and
    repairing the initial dataset by using the repaired access data to obtain the repaired dataset.

2. The statistical method for webpage access data according to claim 1, wherein before judging the first-time access data by using a pre-set judgement model to obtain a judgement result, the method further comprises:
    obtaining an initial behaviour database of the user, wherein all PV data of the user being saved in the initial behaviour database, and each piece of PV data comprising a first-time view field;
    marking an attribute of the first-time view field corresponding to each piece of first-time PV data of the user as a correct attribute;
    filtering the PV data in the initial behaviour database to obtain a filtered behaviour database;
    establishing an initial network judgement model; and
    training the network judgement model by using data in the filtered behaviour database to obtain the pre-set judgement model.

3. The statistical method for webpage access data according to claim 2, wherein each piece of PV data comprises an access page source field, an access source website field and an access activity name field, and filtering the PV data in the initial behaviour database to obtain the filtered behaviour database comprises:

deleting the PV data of which the access page source field, the access source website field and the access activity name field are null in the initial behaviour database from the initial behaviour database to obtain the filtered behaviour database.

4. The statistical method for webpage access data according to claim 3, wherein judging the first-time access data by using the pre-set judgement model to obtain the judgement result comprises:

obtaining a first-time access field of the first-time access data;

judging an attribute of the first-time access field by using the pre-set judgement model;

determining that the judgement result is identical to the pre-set result of the pre-set judgement model under a condition that the attribute of the first-time access field is correct; and determining that the judgement result is contrary to the pre-set result of the pre-set judgement model under a condition that the attribute of the first-time access field is not correct.

5. The statistical method for webpage access data according to claim 1, wherein combining all initial PV data of the user and the associated access data to obtain the repaired access data comprises: modifying a user ID of all initial PV data of the user to a user ID of the associated access data so as to obtain the repaired access data; and repairing the initial dataset by using the repaired access data to obtain the repaired dataset comprises: updating the initial dataset by using the repaired access data to obtain the repaired dataset.

6. A statistical apparatus for webpage access data, comprising: a hardware processor coupled with a memory and configured to execute program modules stored on the memory, wherein the program modules comprise:

a collection module, configured to collect an initial dataset of page access behaviours of a user, the initial dataset comprising one or more initial page view data, the initial page view data for the user to access the target site data;

a first data extraction module, configured to extract first-time access data of the user from the initial dataset;

a judgement module, configured to judge the first-time access data by using a pre-set judgement model to obtain a judgement result;

a matching module, configured to perform dating-back matching in the initial dataset by using the first-time access data to obtain associated access data when the judgement result is contrary to a pre-set result of the pre-set judgement model; and a repairing module, configured to splice and repair the initial dataset based on the associated access data to obtain a repaired dataset;

wherein the matching module comprises:

a filtering module, configured to screen the initial PV (page view) data identical to an Internet Protocol (IP) of the first-time access data and a browser Identifier (ID) from the initial dataset;

a comparison module, configured to compare initial access time of the initial PV data with first-time access time of the first-time access data;

a saving module, configured to save the initial PV data into an access data set if the initial access time is earlier than the first-time access time; and a second data extraction module, configured to extract the initial PV data of which the initial access time is the latest from the access data set, and take the initial PV data of which the initial access time is the latest as the associated access data, wherein the repairing module comprises:

a third data extraction module, configured to extract all initial PV data of the user from the initial dataset;

a combination module, configured to combine all initial PV data of the user and the associated access data to obtain repaired access data; and a repairing sub-module, configured to repair the initial dataset by using the repaired access data to obtain the repaired dataset.

7. The statistical apparatus for webpage access data according to claim 6, wherein the program modules further comprise:

a database obtaining module, configured to obtain an initial behaviour database of the user, all PV data of the user being saved in the initial behaviour database, and each piece of PV data comprising a first-time view field;

an attribute marking module, configured to mark an attribute of the first-time view field corresponding to each piece of first-time PV data of the user as a correct attribute;

a filtration module, configured to filter the PV data in the initial behaviour database to obtain a filtered behaviour database;

a model establishment module, configured to establish an initial network judgement model; and a model obtaining module, configured to train the network judgement model by using data in the filtered behaviour database to obtain the pre-set judgement model.

8. The statistical apparatus for webpage access data according to claim 7, wherein the filtration module is configured to:

delete the PV data of which an access page source field, an access source website field and an access activity name field are null in the initial behaviour database from the initial behaviour database to obtain the filtered behaviour database, each piece of PV data comprising the access page source field, the access source website field and the access activity name field.

9. The statistical apparatus for webpage access data according to claim 8, wherein the judgement module comprises:

a field obtaining module, configured to obtain a first-time access field of the first-time access data;

an attribute judgement module, configured to judge an attribute of the first-time access field by using the pre-set judgement model;

a first determination module, configured to determine that the judgement result is identical to the pre-set result of the pre-set judgement model under a condition that the attribute of the first-time access field is correct; and a second determination module, configured to determine that the judgement result is contrary to the pre-set result of the pre-set judgement model under a condition that the attribute of the first-time access field is not correct.

10. The statistical apparatus for webpage access data according to claim 6, wherein the combination module further comprises: a combination sub-module, configured to modify a user ID of all initial PV data of the user to a user ID of the associated access data so as to obtain the repaired access data; and the repairing sub-module, configured to update the initial dataset by using the repaired access data to obtain the repaired dataset.

\* \* \* \* \*